(12) United States Patent
Ko

(10) Patent No.: US 6,570,631 B2
(45) Date of Patent: May 27, 2003

(54) BLACK MATRIX IN LIQUID CRYSTAL DISPLAY AND METHOD OF FABRICATING THE SAME

(75) Inventor: Byung-Soo Ko, Kyoungki-do (KR)

(73) Assignee: LG. Philps LCD Co., Ltd., Seoul (KR)

( * ) Notice: Subject to any disclaimer, the term of this patent is extended or adjusted under 35 U.S.C. 154(b) by 6 days.

(21) Appl. No.: 10/015,894

(22) Filed: Dec. 17, 2001

(65) Prior Publication Data

US 2002/0085140 A1 Jul. 4, 2002

(30) Foreign Application Priority Data

Dec. 28, 2000 (KR) .................................... P2000-83762

(51) Int. Cl.⁷ ............................................... G02F 1/136
(52) U.S. Cl. ....................................... 349/43; 349/122
(58) Field of Search ........................... 349/43, 44, 122, 349/187, 138; 438/30

(56) References Cited

U.S. PATENT DOCUMENTS 6,211,928 B1 * 4/2001 Oh et al. ..................... 349/43

\* cited by examiner

Primary Examiner—Robert H. Kim
Assistant Examiner—Thoi V Duong

(57) ABSTRACT

A liquid crystal display includes a substrate, a gate line on the substrate, a gate insulating layer on the gate line, a data line on the gate insulating layer, a thin film transistor having a gate electrode, a source electrode, and a drain electrode, wherein the gate electrode is connected to the gate line and the source electrode is connected to the data line, a first passivation layer having a first contact hole exposing the drain electrode and covering the data line and the thin film transistor, the first passivation layer having a first resistance, an insulating layer having a second resistance lower than the first resistance and covering the data line and the thin film transistor, a second passivation layer having a second contact hole connected to the first contact hole and on the insulating layer and the first passivation layer, and a pixel electrode on the second passivation layer and contacting the drain electrode through the first and second contact holes.

20 Claims, 4 Drawing Sheets ved and used for display devices. However, flat panel
BLACK MATRIX IN LIQUID CRYSTAL DISPLAY AND METHOD OF FABRICATING THE SAME This application claims the benefit of Korean Application No. P2000-83762, filed on Dec. 28, 2000, which is hereby incorporated by reference.

BACKGROUND OF THE INVENTION

1. Field of the Invention

The present invention relates to a liquid crystal display, and more particularly, to a black matrix in a liquid crystal display and a method of fabricating the same. Although the present invention is suitable for a wide scope of applications, it is particularly suitable for improving an aperture ratio.

2. Discussion of the Related Art

Until recently, a cathode-ray tube (CRT) has been mainly developed and used for display devices. However, flat panel displays draw attention because of their small depth dimensions, desirably low weight, and low voltage power supply requirements. Presently, thin film transistor-liquid crystal displays (TFT-LCDs) with high resolution and small depth dimension have been developed.

FIG. 1 shows a conventional liquid crystal display (LCD).

In FIG. 1, the LCD includes upper and lower substrates 5 and 22. A black matrix 6, a color filter 7 including sub-color filters (red, green, blue) 8, and a transparent common electrode 18 disposed above the color filter 7 are formed on the upper substrate 5. A pixel region "P", a pixel electrode 17 disposed at the pixel region "P", and an array line including a switching device "T" are formed on the lower substrate 22. A liquid crystal layer 14 is interposed between the upper and lower substrates 5 and 22. The black matrix 6 is formed by deposition and patterning of an opaque metallic material having a low reflectance or by coating and patterning an opaque photosensitive resin.

The lower substrate 22 may also be referred to as an array substrate where thin film transistors "T" are arranged in a matrix configuration, and gate and data lines 13 and 15 that cross the thin film transistors "T" are formed. The pixel region "P" is defined by the gate and data lines 13 and 15, and a transparent conductive metal such as indium-tin-oxide (ITO) having a relatively high transmittance is used as the pixel electrode 17 on the pixel region "P".

If a voltage is applied to the common electrode 18 of the upper substrate 5 and the pixel electrode 17 of the lower substrate 22, a transmittance of the LCD is changed according to the alignment state of the liquid crystal layer 14 so that images can be displayed.

At the lower substrate 22, the data line 15 and the pixel electrode 17 is spaced apart from each other, thereby eliminating an electric interference. Accordingly, the liquid crystal layer on a separated region 19 between the data line 15 and the pixel electrode 17 has a transmittance different from the liquid crystal layer on the pixel electrode 17. Accordingly, a light leakage occurs at the separated region 19. To prevent this phenomenon, the black matrix 6 is disposed at the corresponding region of the upper substrate 5. In the conventional art, a black matrix is disposed on the upper substrate 5. Thus, the black matrix is designed to include an alignment margin considering a misalignment in attachment.

However, in the conventional structure of the black matrix, an aperture ratio is reduced due to the alignment margin.

SUMMARY OF THE INVENTION

Accordingly, the present invention is directed to a black matrix in a liquid crystal display and a method of fabricating the same that substantially obviates one or more of problems due to limitations and disadvantages of the related art.

Another object of the present invention is to improve an aperture ratio of an LCD.

Another object of the present invention is to reduce a parasitic capacitance of an LCD.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes a substrate, a gate line on the substrate, a gate insulating layer on the gate line, a data line on the gate insulating layer, a thin film transistor having a gate electrode, a source electrode, and a drain electrode, wherein the gate electrode is connected to the gate line and the source electrode is connected to the data line, a first passivation layer having a first contact hole exposing the drain electrode and covering the data line and the thin film transistor, the first passivation layer having a first resistance, an insulating layer having a second resistance lower than the first resistance and covering the data line and the thin film transistor, a second passivation layer having a second contact hole connected to the first contact hole and on the insulating layer and the first passivation layer, and a pixel electrode on the second passivation layer and contacting the drain electrode through the first and second contact holes.

In another aspect of the present invention, a method of fabricating a liquid crystal display includes forming a gate line on a substrate, forming a gate insulating layer on the gate line, forming a data line on the gate insulating layer, forming a thin film transistor having a gate electrode, a source electrode, and a drain electrode, forming a first passivation layer having a first resistance and covering the data line and the thin film transistor, forming an insulating layer having a second resistance lower than the first resistance and covering the data line and the thin film transistor, forming a second passivation layer on the insulating layer and the first passivation layer, forming first and second contact holes in the first and second passivation layers, respectively, the first contact hole exposing the drain electrode and the second contact hole connected to the first contact hole, and forming a pixel electrode contacting the drain electrode through the first and second contact holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
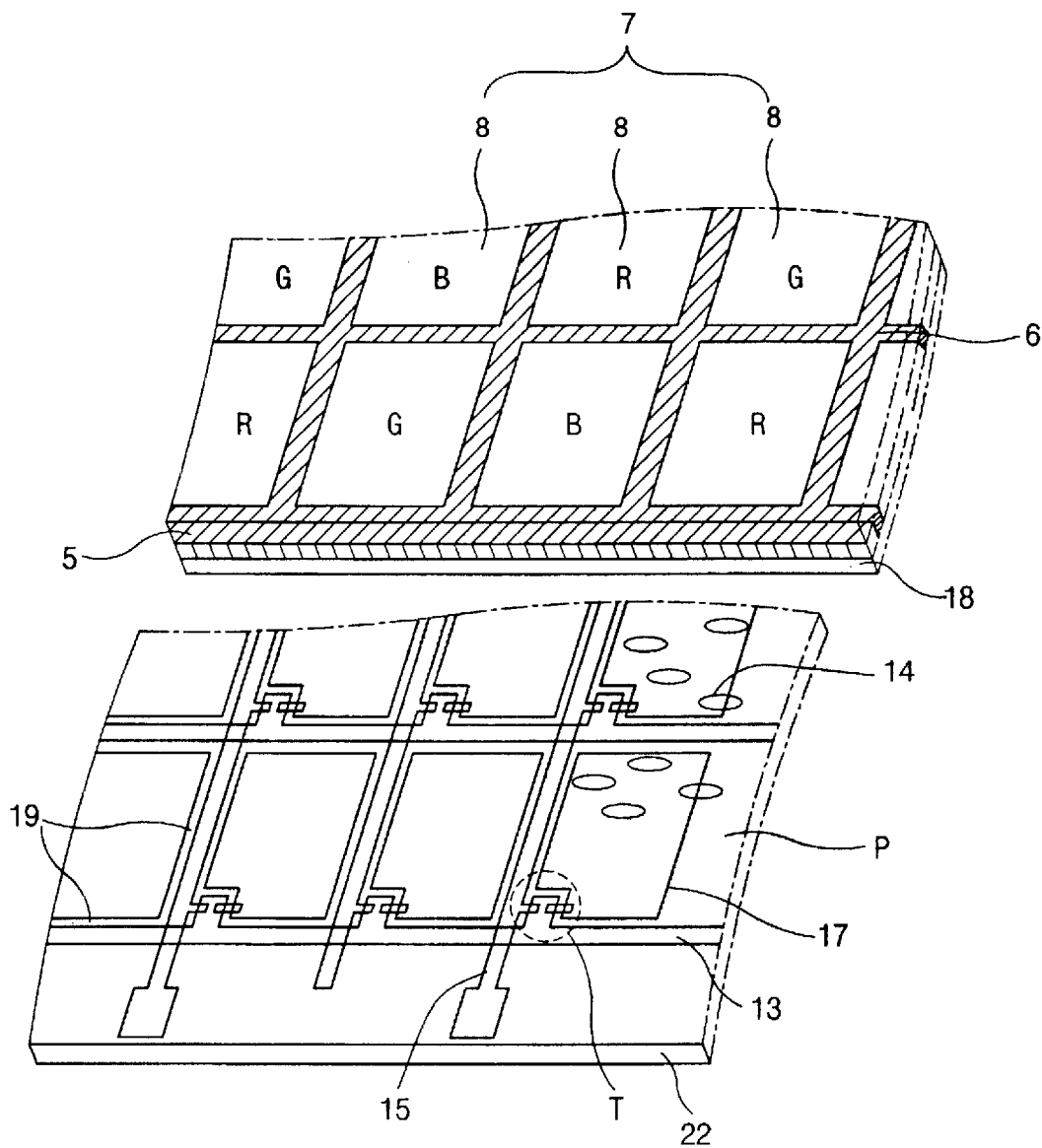
FIG. 1 is a schematic perspective view of a conventional liquid crystal display.
Figure 2:
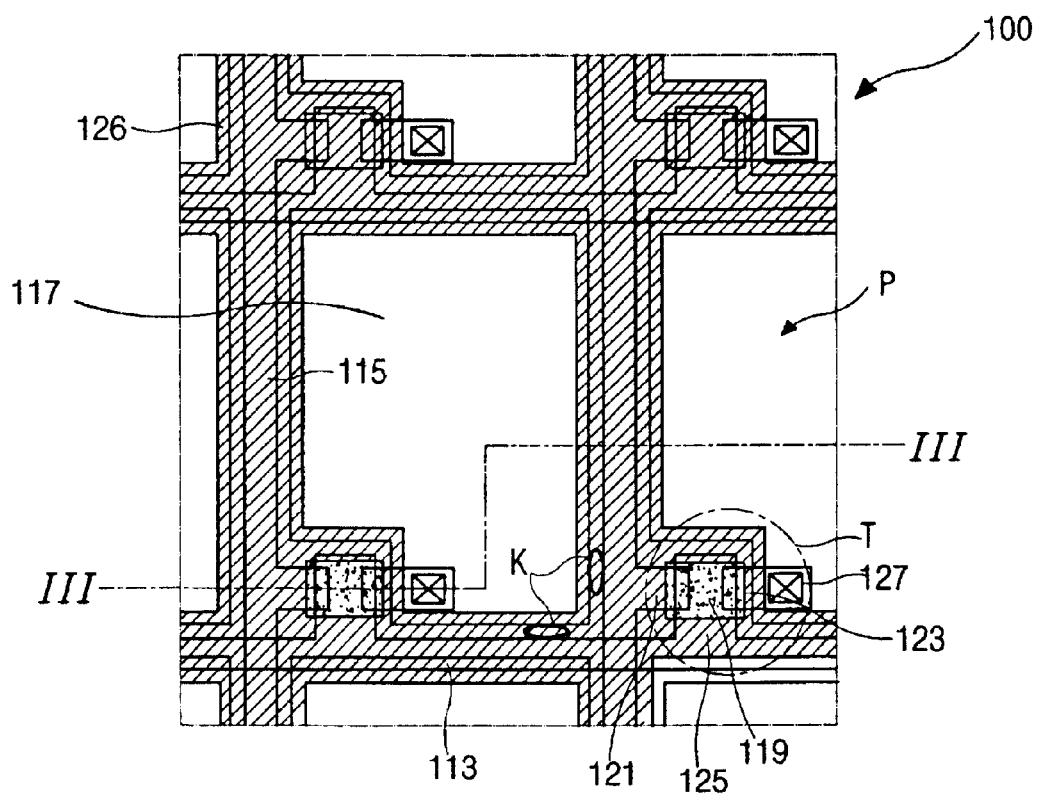
FIG. 2 is a schematic plane view partially showing a lower substrate of a liquid crystal display according to first and second embodiments of the present invention.

FIG. 2 is a schematic plane view partially showing a lower substrate of a liquid crystal display according to first and second embodiments of the present invention.

In FIG. 2, gate and data lines 113 and 115 cross each other in the shape of matrix and a TFT "T" is disposed adjacent to the cross region. The TFT "T" includes a gate electrode 125, an active layer 119 and source and drain electrodes 121 and 123. A pixel electrode 117 is disposed at the region defined by the intersection of the gate and data lines 113 and 115 and connected to the drain electrode 123 through a contact hole 127. In addition to the above structure, a black matrix 126 of an insulating layer is formed on the gate and data lines 113 and 115 and the TFT "T", and extended to a separated region "K" between the gate line 113 and the pixel electrode 117 or between the data line 115 and the pixel electrode 117. Since the separated region "K", where a light leakage occurs, is screened by the black matrix 126 of the same lower substrate, an aperture ratio of the LCD according to the first embodiment of the present invention is higher than that of the conventional LCD fabricated considering an alignment margin.

Figure 3A:
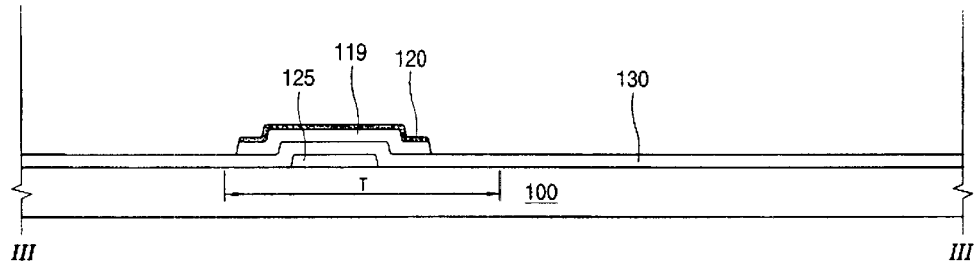
FIGS. 3A to 3C are schematic cross-sectional views illustrating a fabricating process, taken along the line "III—III" of FIG. 2 according to the first embodiment of the present invention.
Figure 3B:
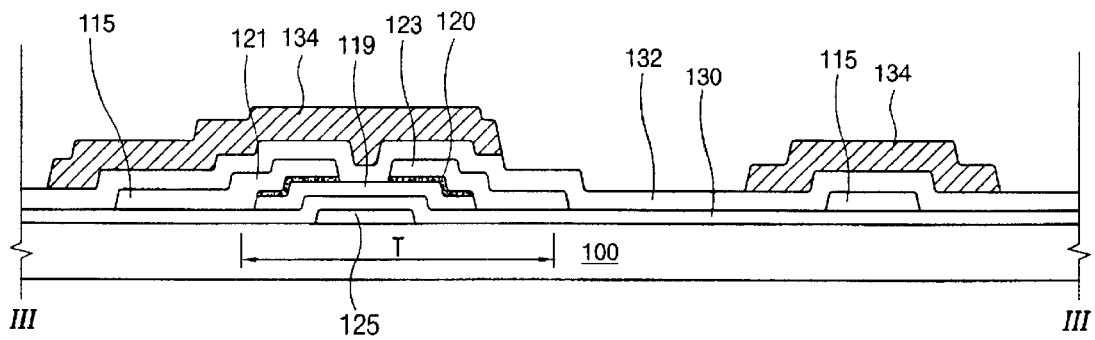
Figure 3C:
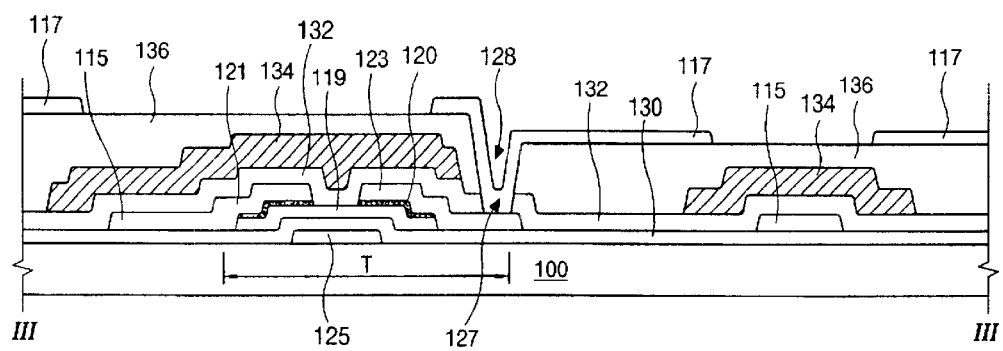

FIGS. 3A to 3C are schematic cross-sectional views illustrating a fabricating process, taken along the line "III—III" of FIG. 2.

In FIG. 3A, a gate line 113 (shown in FIG. 2) and a gate electrode 125 are formed on a substrate 100 by depositing and patterning a first metal layer. One of conductive metals, such as aluminum (Al), aluminum alloy, copper (Cu), tungsten (W), molybdenum (Mo), and chromium (Cr), is used for the first metal layer. Then, a gate insulating layer 130 of silicon nitride (SiNx) or silicon oxide (SiO$_2$) is formed on the entire substrate 100 having the gate electrode 125 thereon. Subsequently, an active layer 119 of intrinsic amorphous silicon (a-Si:H) and an ohmic contact layer 120 of impurity-doped amorphous silicon (n+ a-Si:H) are formed on the gate insulating layer 130.

In FIG. 3B, a data line 115 crossing the gate line 113 (shown in FIG. 2), a source electrode 121 elongated from the data line 115 and a drain electrode 123 spaced apart from the source electrode 121 are formed on the ohmic contact layer 120 by depositing and patterning a second metal layer. Then, a first passivation layer 132 of SiNx or SiO$_2$ having a first resistance is formed on the entire substrate 100 having the source and drain electrodes 121 and 123. The first passivation layer 132 prevents the active layer 119 from contacting a black matrix of an insulating layer 134 having a second resistance lower than the first resistance. In the absence of the first passivation layer 132, a threshold voltage (V$_{th}$) of the active layer 119 that contacts the insulating layer 134 having the second resistance fluctuates so that over-current or under-current phenomenon may occur when a voltage is applied to the gate electrode 125. Subsequently, the black matrix is formed on the TFT "T" and the data line 115 by depositing and patterning the insulating layer 134 such as a color resin or an organic black matrix (black resin) having the second resistance lower than the first resistance. In the case of using the color resin, a color filter may be formed at the pixel region of the lower substrate.

In FIG. 3C, a second passivation layer 136 is formed on the insulating layer 134 by depositing an organic insulating layer such as acrylic resin, benzocyclobutene (BCB) or cyclo-olefin resin. Then, first and second contact holes 127 and 128 partially exposing the drain electrode 123 are formed in the first and second passivation layers 132 and 136, respectively, and a pixel electrode 117 is formed on the second passivation layer 136 by depositing and patterning a transparent conductive metal.

Since the LCD according to the first embodiment of the present invention does not need an additional black matrix for an alignment margin, an aperture ratio is improved.

However, since the second resistance of the insulating layer is lower than the first resistance of the first passivation layer, a parasitic capacitance may be generated between the insulating layer 134 and the lower metal line such as data line 115, so that a display quality may be decreased. To improve this problem, a second embodiment is suggested.

Figure 4A:
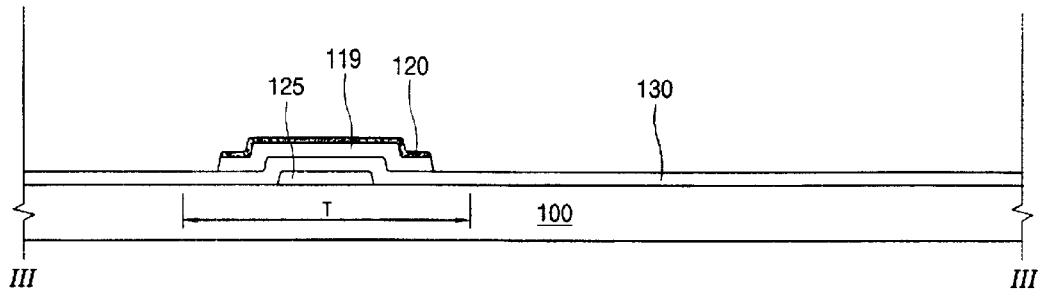
FIGS. 4A to 4C are schematic cross-sectional views illustrating a fabricating process, taken along the line "III—III" of FIG. 2 according to the second embodiment of the present invention.
Figure 4B:
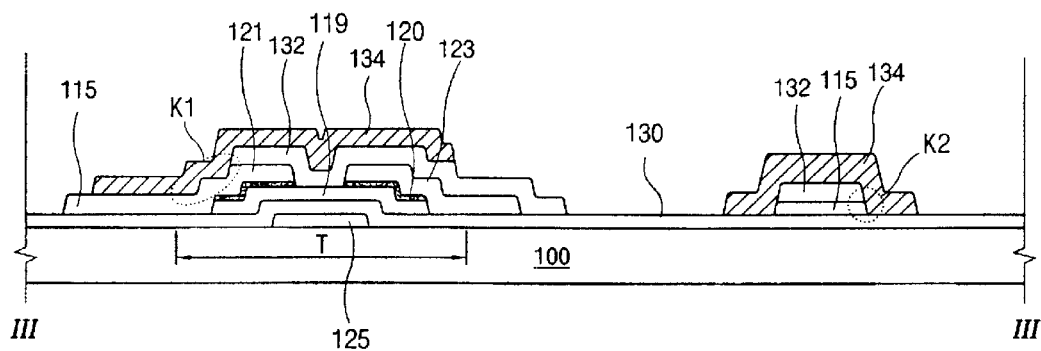
Figure 4C:
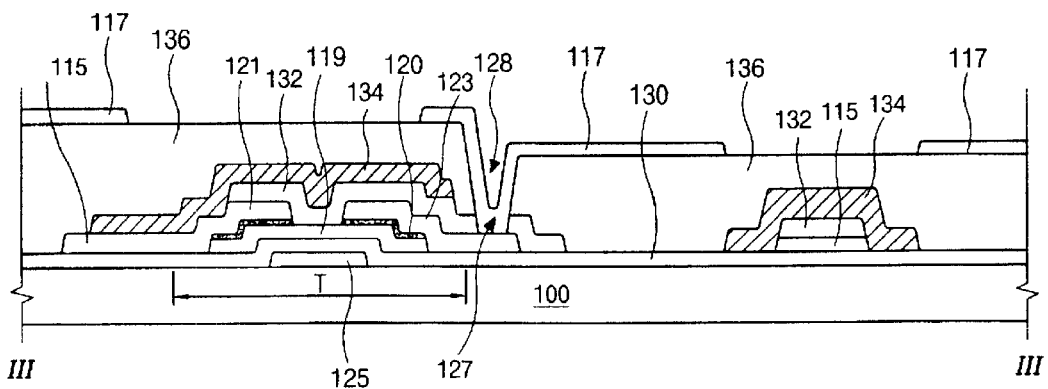

FIGS. 4A to 4C are schematic cross-sectional views illustrating a fabricating process, taken along the line "III—III" of FIG. 2 according to the second embodiment of the present invention. (Since a plane view of the LCD according to the second embodiment is the same as the plane view of the LCD according to the first embodiment. Thus, FIG. 2 and its explanation can be applied to the second embodiment.)

In FIG. 4A, a gate line (shown as 113 in FIG. 2) and a gate electrode 125 are formed on a substrate 100 by depositing and patterning a first metal layer. One of conductive metals, such as aluminum (Al), aluminum alloy, copper (Cu), tungsten (W), molybdenum (Mo), and chromium (Cr), is used for the first metal layer. Then, a gate insulating layer 130 of silicon nitride (SiNx) or silicon oxide (SiO$_2$) is formed on the entire substrate 100 having the gate electrode 125. Subsequently, an active layer 119 of intrinsic amorphous silicon (a-Si:H) and an ohmic contact layer 120 of impurity-doped amorphous silicon (n+ a-Si:H) are formed on the gate insulating layer 130.

In FIG. 4B, a data line 115 crossing the gate line 113, a source electrode 121 elongated from the data line 115 and a drain electrode 123 spaced apart from the source electrode 121 are formed on the ohmic contact layer 120 by depositing and patterning a second metal layer. Then, a first passivation layer 132 having a first resistance is formed on the TFT "T" and the data line 115 only by depositing and patterning one of SiNx and SiO$_2$. Hence, the source electrode 121 and one side of the data line 115 are exposed at the regions "K1" and "K2", respectively. Subsequently, a black matrix is formed on the data line 115 and the TFT "T" by depositing and patterning an insulating layer 134 such as a color resin or an organic black matrix (black resin) having a second resistance lower than the first resistance. In the case of using the color resin, a color filter can be formed at the pixel region of the lower substrate instead of the upper substrate. The insulating layer 134 covers the data line 115 including the first passivation layer 132 and is connected to the exposed source electrode 121 at the region "K1" and the data line 115 at the region "K2". Therefore, since the insulating layer 134 and the data line 115 are connected and equi-potential, a parasitic capacitance is prevented and a display quality is improved.

In FIG. 4C, a second passivation layer 136 is formed on the insulating layer 134 by depositing an organic insulating layer such as acrylic resin, benzocyclobutene (BCB) or cyclo-olefin resin. Then, first and second contact holes 127 and 128 partially exposing the drain electrode 123 are formed in the first and second passivation layers 132 and 136, respectively. A pixel electrode 117 is formed on the second passivation layer 136 by depositing and patterning a transparent conductive metal.

Consequently, the LCD according to the present invention has some advantages. First, since the black matrix of the insulating layer is formed on the lower substrate, an aperture ratio is improved by eliminating a necessity of the alignment margin. Second, since the insulating layer having the second resistance lower than the first resistance is connected to the lower metal line such as the data line, the parasitic capacitance between the insulating layer and the lower metal line is not generated. As a result, a degradation in the display quality due to a cross-talk or a flicker may be prevented.

It will be apparent to those skilled in the art that various modifications and variations can be made in the black matrix in the liquid crystal display device and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display, comprising:
   a substrate;
   a gate line on the substrate;
   a gate insulating layer on the gate line;
   a data line on the gate insulating layer;
   a thin film transistor having a gate electrode, a source electrode and a drain electrode wherein the gate electrode is connected to the gate line and the source electrode is connected to the data line;
   a first passivation layer having a first contact hole exposing the drain electrode and covering the data line and the thin film transistor, the first passivation layer having a first resistance;
   an insulating layer having a second resistance lower than the first resistance to contact and cover the data line and the thin film transistor;
   a second passivation layer having a second contact hole connected to the first contact hole and on the insulating layer and the first passivation layer; and
   a pixel electrode on the second passivation layer contacting the drain electrode through the first and second contact holes.

2. The liquid crystal display according to claim 1, further comprising a color filter on the first passivation layer.

3. The liquid crystal display according to claim 1, wherein the insulating layer includes one of a color resin and a black resin.

4. The liquid crystal display according to claim 1, wherein the insulating layer contacts the source electrode and the data line.

5. The liquid crystal display according to claim 1, wherein the gate and data lines are selected from the group consisting of aluminum, aluminum alloy, copper, tungsten, molybdenum, and chromium.

6. The liquid crystal display according to claim 1, wherein the first and second passivation layers include one of a non-organic insulating material and an organic insulating material.

7. The liquid crystal display according to claim 1, wherein the pixel electrode includes one of indium-tin-oxide and indium-zinc-oxide.

8. The liquid crystal display according to claim 1, wherein the source electrode has a portion directly contacting the insulating layer.

9. The liquid crystal display according to claim 1, wherein the data line has a portion directly contacting the insulating layer.

10. A method of fabricating a liquid crystal display, comprising:
    forming a gate line on a substrate;
    forming a gate insulating layer on the gate line;
    forming a data line on the gate insulating layer;
    forming a thin film transistor having a gate electrode, a source electrode, and a drain electrode;
    forming a first passivation layer having a first resistance and covering the data line and the thin film transistor;
    forming an insulating layer having a second resistance lower than the first resistance to cover and contact the data line and the thin film transistor;
    forming a second passivation layer on the insulating layer and the first passivation layer;
    forming first and second contact holes in the first and second passivation layers, respectively, the first contact hole exposing the drain electrode and the second contact hole connected to the first contact hole; and
    forming a pixel electrode contacting the drain electrode through the first and second contact holes.

11. The method according to claim 10, wherein the insulating layer directly contacts the source electrode and the data line.

12. The method according to claim 10, further comprising forming a color filter on the first passivation layer.

13. The liquid crystal display according to claim 4, wherein the insulating layer contacts side portions of both the source electrode and the data line.

14. The liquid crystal display according to claim 8, wherein the source electrode has a side portion directly contacting the insulating layer.

15. The liquid crystal display according to claim 9, wherein the data line has a side portion directly contacting the insulating layer.

16. The method according to claim 11, wherein the insulating layer directly contacts side portions of both the source electrode and the data line.

17. A liquid crystal display, comprising:
    a substrate;
    a gate line on the substrate;
    a gate insulating layer on the gate line;
    a data line on the gate insulating layer;
    a thin film transistor having a gate electrode, a source electrode and a drain electrode wherein the gate electrode is connected to the gate line and the source electrode is connected to the data line;
    a first passivation layer having a first contact hole exposing the drain electrode and covering the data line and the thin film transistor, the first passivation layer having a first resistance;

an insulating layer having a second resistance lower than the first resistance and covering the data line and the thin film transistor;

a second passivation layer having a second contact hole connected to the first contact hole and on the insulating layer and the first passivation layer; and a pixel electrode on the second passivation layer and contacting the drain electrode through the first and second contact holes, wherein the insulating layer contacts the source electrode and the data line.

18. A liquid crystal display, comprising:

a substrate;

a gate line on the substrate;

a gate insulating layer on the gate line;

a data line on the gate insulating layer;

a thin film transistor having a gate electrode, a source electrode and a drain electrode wherein the gate electrode is connected to the gate line and the source electrode is connected to the data line;

a first passivation layer having a first contact hole exposing the drain electrode and covering the data line and the thin film transistor, the first passivation layer having a first resistance;

an insulating layer having a second resistance lower than the first resistance and covering the data line and the thin film transistor;

a second passivation layer having a second contact hole connected to the first contact hole and on the insulating layer and the first passivation layer; and a pixel electrode on the second passivation layer and contacting the drain electrode through the first and second contact holes, wherein the source electrode has a portion directly contacting the insulating layer.

19. A liquid crystal display, comprising:

a substrate;

a gate line on the substrate;

a gate insulating layer on the gate line;

a data line on the gate insulating layer;

a thin film transistor having a gate electrode, a source electrode and a drain electrode wherein the gate electrode is connected to the gate line and the source electrode is connected to the data line;

a first passivation layer having a first contact hole exposing the drain electrode and covering the data line and the thin film transistor, the first passivation layer having a first resistance;

an insulating layer having a second resistance lower than the first resistance and covering the data line and the thin film transistor;

a second passivation layer having a second contact hole connected to the first contact hole and on the insulating layer and the first passivation layer; and a pixel electrode on the second passivation layer and contacting the drain electrode through the first and second contact holes, wherein the data line has a portion directly contacting the insulating layer.

20. A method of fabricating a liquid crystal display, comprising:

forming a gate line on a substrate;

forming a gate insulating layer on the gate line;

forming a data line on the gate insulating layer;

forming a thin film transistor having a gate electrode, a source electrode, and a drain electrode;

forming a first passivation layer having a first resistance and covering the data line and the thin film transistor;

forming an insulating layer having a second resistance lower than the first resistance and covering the data line and the thin film transistor;

forming a second passivation layer on the insulating layer and the first passivation layer;

forming first and second contact holes in the first and second passivation layers, respectively, the first contact hole exposing the drain electrode and the second contact hole connected to the first contact hole; and forming a pixel electrode contacting the drain electrode through the first and second contact holes, wherein the insulating layer directly contacts the source electrode and the data line.

* * * * *